United States Patent [19]

Palmer et al.

[11] Patent Number: 4,457,781
[45] Date of Patent: Jul. 3, 1984

[54] METHOD FOR SOLIDIFYING WASTE SLIME SUSPENSIONS

[75] Inventors: Jay W. Palmer, Tampa, Fla.; John C. Gaynor, Des Plaines, Ill.

[73] Assignee: United States Gypsum Company, Chicago, Ill.

[21] Appl. No.: 467,891

[22] Filed: Feb. 18, 1983

Related U.S. Application Data

[63] Continuation-in-part of Ser. No. 330,550, Dec. 12, 1981, Pat. No. 4,388,292.

[51] Int. Cl.[1] .................. B09B 1/00; C04B 11/00; C01F 11/46; C01B 25/16
[52] U.S. Cl. .................. 106/109; 106/110; 106/900; 423/167; 423/319; 423/555; 405/128
[58] Field of Search .................. 423/555, 317, 167; 106/109, 110, 111, 900, 90; 405/128

[56] References Cited

U.S. PATENT DOCUMENTS

| | | | |
|---|---|---|---|
| 3,761,239 | 9/1973 | Cook et al. | 71/63 |
| 3,876,439 | 4/1975 | Schneider | 106/90 |
| 3,947,284 | 3/1976 | Kitsugi et al. | 106/90 |
| 3,980,489 | 9/1976 | Schneider | 106/90 |
| 3,980,490 | 9/1976 | Schneider | 106/90 |

FOREIGN PATENT DOCUMENTS

| | | | |
|---|---|---|---|
| 52-65916 | 5/1977 | Japan | 106/109 |
| 52-23792 | 6/1977 | Japan | 106/109 |
| 56-95399 | 8/1981 | Japan | 106/109 |

*Primary Examiner*—Gary P. Straub
*Attorney, Agent, or Firm*—Kenneth E. Roberts; Robert H. Robinson; Samuel Kurlandsky

[57] ABSTRACT

Solidification of colloidal argillaceous matter in essentially non-settling, aqueous slime media into a solid stable matrix is accomplished by mixing such slime with a hydratable calcium sulfate and hydrating to form an interlocking strength bearing matrix. The method is particularly useful for coalescing phosphatic clay slimes with hydratable calcium sulfate prepared from the co-produced waste phosphogypsum.

17 Claims, 1 Drawing Figure

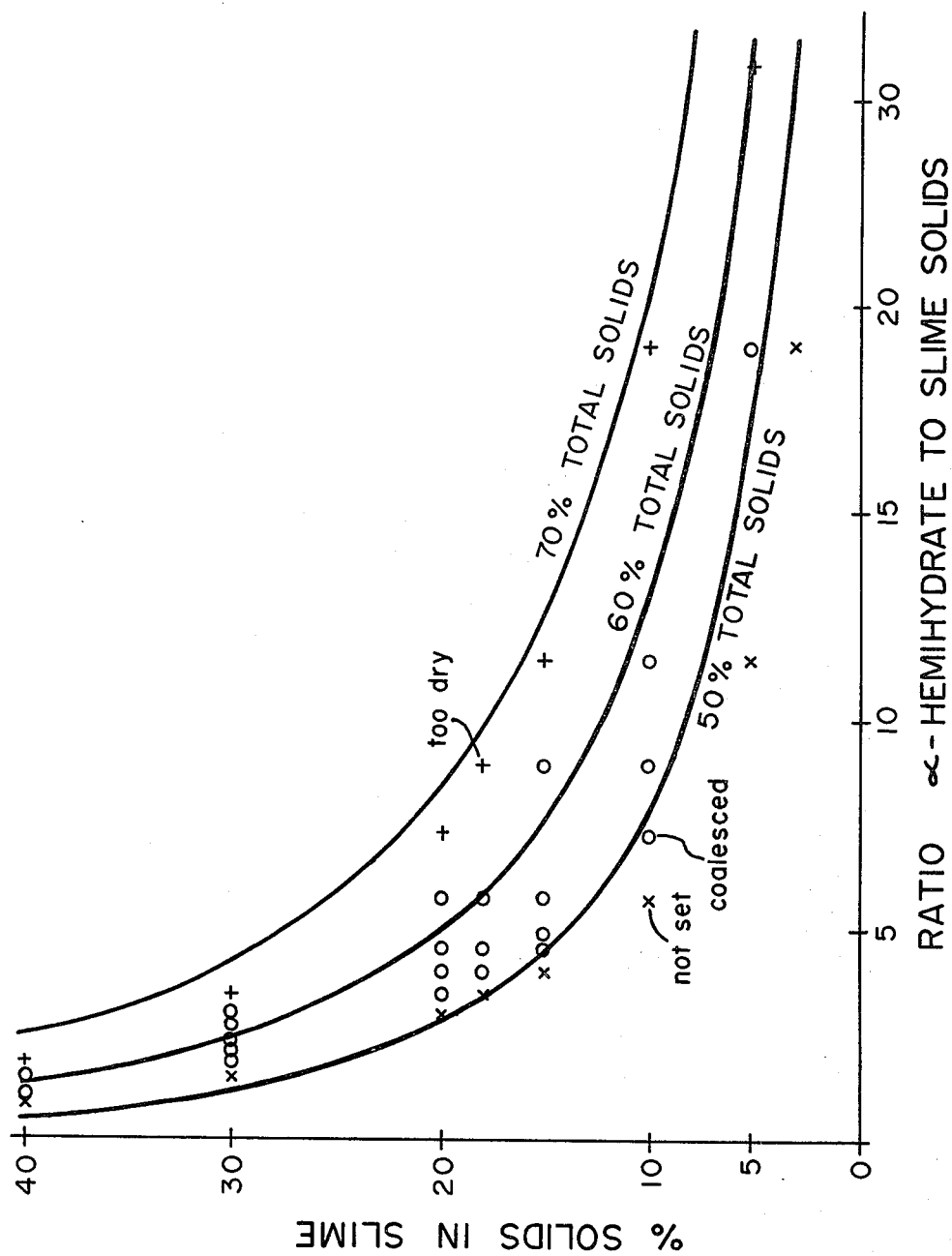

METHOD FOR SOLIDIFYING WASTE SLIME SUSPENSIONS

This application is a continuation-in-part of Ser. No. 330,550, filed Dec. 16, 1981, now U.S. Pat. No. 4,388,292.

BACKGROUND OF THE INVENTION

1. Field of the Invention

The present invention relates to a process for solidifying non-settling waste "slime" suspensions, such as encountered in mineralogical operations, to a solid, stable matrix. More particularly, the present invention relates to consolidating finely divided colloidal earthy material in aqueous suspension, such as the slimes derived from phosphate operations for recovery or disposal as solid matter.

Slime ponds develop during many mineralogical operations. The ponds generally comprise a suspension of finely divided earthy materials at a solids concentration of about 0.5 to 20% or more in essentially a non-settling aqueous media and generally include colloidal argillaceous particles finer than about 150 U.S. standard mesh (and most less than 1 micron). The composition of the slime solids will vary depending upon the particular operation; but the non-settling characteristic, whether from mining activities, well drilling, water treatment or other industrial operations producing clay containing ponds that are difficult to settle, is rather constant. Such will be exemplified hereinafter by reference to the phosphatic clay slimes generated in phosphate or beneficiation operations.

In phosphate ore processing, a common procedure is to convert one or more land areas into lagoons by means of low dikes provided with proper outfalls to discharge effluent water, so as to contain the earthy solids washed from the ore and the solids liberated from the matrix during grinding, dressing and other beneficiation operations. As transferred to the impounding area from the beneficiation plant, the slimes may contain as little as about 1.5 to 5% solids on a dry weight basis. The solids concentration increases during settling; but after a level of about 20–25% solids is reached in the over-all pond, a virtually impervious crust of materials containing about 20% water forms over the surface of the slime pond, preventing further evaporation and settling. This becomes a considerable storage problem for continued operations because about 0.5–1.5 tons of slime suspension are produced per ton of finished phosphate ore. Because of the great water content of these aqueous suspensions, the slime volume exceeds the volume of the matrix mined.

A typical wet process phosphoric acid plant also produces about 1.5 to 1.6 tons of phosphogypsum per ton of rock digested. A common procedure to handle the gypsum, is to stack or pile it, initially using two or more lagoon areas. As one area becomes filled, the gypsum stream is diverted to the other and the first is allowed to drain and dry out sufficiently to support mechanical equipment. The dike on the first is then increased in height, using deposited gypsum as a source of diking material and the output shifted from the second to the altered first area. It has been estimated that there are over 2 billion tons of phosphatic clay slime solids currently being stored in lagoons in Florida; and annually, 10–25 million tons are being added to this figure. Yet to date no practical means exists for completely dewatering and consolidating these aqueous colloidal suspensions to a solid matrix.

2. Description of the Prior Art

Both government and industry have been long concerned with the problems posed by the phosphate slime ponds and have conducted considerable research to find a suitable method for dealing with them. Most of the various methods that have been considered focus only on thickening the slimes to a more concentrated aqueous suspension. The *Bureau of Mines Report of Investigations* No. 6163 entitled "Chemical and Physical Beneficiation of Florida Phosphate Slimes" published in 1963; No. 6844 entitled "Chemical Processing of Florida Phosphate Rock Slime", published in 1966; No. 8611 entitled "Large Scale Dewatering of Phosphate Claim Waste from Central Florida" published in 1982; and *Information Circular* 8668 entitled "The Florida Phosphate Slimes Problem", published in 1975; and such industry efforts as U.S. Pat. No. 4,051,027 entitled "Settling Clay-Containing Slimes" illustrate these endeavors.

Attempts to consolidate the slime suspensions to a solid material include U.S. Pat. No. 2,947,418 which proposes dewatering the slimes to 40% solids in very thin layers of slime in the settling basin and removing the settled surface water before successive very thin layers are added in order that each layer may dry out before additional slime suspension is added. This is not practical on a commercial basis. U.S. Pat. No. 3,763,041 observes that when the phosphatic slimes are mixed with sand tailings, the slimes dewater faster; and proposes that the mixtures could possess acceptable bearing strengths approaching that of normal soils. U.S. Pat. No. 3,680,698 proposes that the slimes be compacted with tailings by mixing the slime with a liquid coagulant under shearing agitation to flocculate the suspension allowing settling with continued slow agitation to dewater the slime and then adding the tailings in hopes of forming a porous aggregate. However, none of these proposals to consolidate the slimes appears to have been practiced in the field nor gained any commercial success and the conventional practice of passing the freshly generated slime suspension to retention basins for perpetual storage continues.

SUMMARY OF THE INVENTION

From the above, there is a need in the art for an effective means to alleviate the perpetual maintenance of non-settling slime ponds. The technology exists to partly dewater such slime suspension; however, heretofore there does not appear to be any known practical means to consolidate these aqueous suspensions to a stable set solid, such as to a soil or to a load-bearing, strength possessing solid. Furthermore, there is a need in the industry for reducing stockpiling of other waste materials in the industry operations such as the waste gypsum and the sand tailings stock piles.

In our co-pending patent application Ser. No. 330,550 now U.S. Pat. No. 4,388,292 it was found that small anhydrite crystal relics, obtained in a purification of phosphogypsum, could be admixed with amounts of phosphatic clay slime and, in about 3 to 6 weeks time, the mass would set up forming a stable solid material.

Such inherently non-settling colloidal argillaceous suspensions as phosphatic clay slimes heretofore have not been amenable to fully dewatering and coalescing into a solid form. Surprisingly, we have now found that such suspensions will very significantly dewater and coalesce into a load bearing solid upon the addition of effective amounts of hydratable calcium sulfate. Thus, we have found that non-settling phosphatic clay slimes of about 1-40 weight % solids may be solidified by mixing them with a hydratable calcium sulfate, such as anhydrite II or hemihydrate in amounts of about 1 to 9 times or more by weight of calcium sulfate based on the dry weight of suspended argillaceous solids, provided that the total solids of the admixtures are in the general range of about 50-70% total solids for hemihydrate and up to 85% for anhydrite. The manner of mixing and handling the clay suspension, and the particular proportions and specific type of hydratable calcium sulfate to suspended clay solids, and the time of hydrating for any particular slime to achieve significant dewatering and coalescing will depend upon the content of the particular argillaceous solids, type and source of hydratable calcium sulfate and the degree of coalescence from a loose soil condition to a rigid load bearing solid that is desired in the coalesced solids.

BRIEF DESCRIPTION OF THE DRAWINGS

FIG. 1 is a plot of percent by weight suspended solids in a clay suspension versus various weight proportions of calcium sulfate hemihydrate to slime solids on a dry weight basis and showing whether various mixtures did or did not significantly dewater and coalesce into a solid in a short period of time.

DETAILED DESCRIPTION OF THE PREFERRED EMBODIMENTS

One highly preferred embodiment comprises blending fresh, very dilute phosphatic clay slime directly from the beneficiation operation at a few percent suspended solids with an aged and thickened slime from one of the older lagoons to result in a suspension of about 10-20% solids. Hydratable calcium sulfate, such as alpha hemihydrate derived from the phosphogypsum piles of the phosphoric acid plant, and the suspension are mixed by pumping each to a new lagoon. In from about ½ hour to about 6 hours depending upon the proportions of the solids in the suspension, the suspension will dewater, coagulate, coalesce and harden to a load bearing solid. The solids may then be used to increase the levee of this lagoon and a second batch of fresh blended suspension may be added to the lagoon.

Another preferred embodiment comprises metering hydratable calcium sulfate, such as anhydride II into phosphatic slime or used waste drilling mud suspensions, and pumping the blend to a reservoir. After about 25-60% of the anhydrite present in the blend has hydrated to dihydrate, there is flocculation and coagulation of the solids as a thick pulp. A dike is opened to drain the clarified water for recycle in drilling operations, and the moist coagulated pulp solids are allowed to coalesce by the further hydration of the anhydrite in the blend to a point sufficient to support mechanical equipment. Thereupon, the hardened solids are scraped out and passed to a land fill and a fresh blend is introduced into the reservoir.

The argillaceous suspension which may be treated in the process of the present invention may be any aqueous suspension of very finely divided solids in a non-settling state, such as phosphatic clay slimes and drilling mud slimes, water treatment slimes and other such suspensions. Such suspensions may be exemplified further by other mining waste slimes encountered in coal, taconite, copper, iron and uranium mining operations. Oil, gas and water drilling muds may also be treated. Industrial and municipal slimes from gas scrubbers, water and sewage treatment, waste paper pulp slimes and aluminum red muds are also included. Generally, the solids content will vary from about 1 to 20% or more. In the evaluations to date, 15 to 20% suspended solids slimes appear to be a preferred level for handling in the field. In the case of phosphatic clay slimes, such a preferred level of handling may be obtained directly from the older holding ponds or lagoons. Further, fresher phosphatic clay slimes may be treated with conventional flocculating or thickening agents prior to treatment according to the present invention. In addition, sludges from these older ponds may be blended with fresher slimes directly from the desliming operation, and pug mill blended with the hydratable calcium sulfate to obtain the preferred levels of total solids and preferred proportions of hydratable calcium sulfate to clay solids for treatment according to the present invention.

Any hydratable calcium sulfate may be used in the process of the present invention. The time that can be tolerated for coagulation, coalescing and hardening, and the cost and availability of a particular hydratable calcium sulfate source appear to be determinant for any particular application according to the present invention. The hydratable calcium sulfate may be derived from natural rock or may be chemically derived for use in the presence process. Soluble anhydrite III is suitable but is not preferred due to cost of production and a tendency to convert so fast as to fully hydrate without full flocculation and coalescence of the suspended clay solids. Beta hemihydrate is also suitable but hydrates rapidly and thus is not preferred. For convenience in phosphate operations, as applied to phosphatic clay slimes, alpha hemihydrate and anhydrite II derived from the co-produced phosphogypsum calcium sulfate of the phosphate plant are materials of preference. For other clay suspensions, hydratable calcium sulfates may of course be derived from natural rock, flue gas desulfurization operations, or other chemical processes such as from titanium dioxide, citric acid and hydrofluoric acid manufacturing operations.

The ratio of the particular hydratable calcium sulfate to the argillaceous solids, and the total solids in the blend are critical. If the total solids in the blend is above about 70% by weight the hemihydrate yields a mixture that, as a practical matter is too dry to handle readily and is uneconomical to process. Below generally about 47% total solids in the admixture, at least for hemihydrate and suspensions containing about 5-40% clay solids in the suspension, the blend does not coalesce. For anhydrite II higher total solids should be present; however this may be accomplished in stages due to its slower hydration rate. Thus in the case of a dilute slime (e.g. 1-10% solids), anhydrite II may be blended and after about 2 days to about 2 weeks the clarified supernatant liquor may be removed to increase the solids and proportion to anhydrite to clay in the remaining hydrating mass. Optimum total amounts of anhydrite II additive appear to be about 4-5 parts of anhydrite per 1 part of clay solids to provide about 70-80% total solids having a soft soil-like coalescence; and weight proportions of anhydrite to clay solids above about 8:1 to provide about 75-85% total solids have a high strength bearing coalescence without extensive soft spots in the coalesced mass.

It appears that when there is sufficient total solids and sufficient hydratable calcium sulfate in proportion to the argillaceous solids in the hydrating mass, a simultaneous dewatering and coagulation of the loose hydrous clay platelet structure occurs by the hydrating crystals of the calcium dihydrate growing between the platelets. The hydrating gypsum crystals gather the finely divided clay solids as the gypsum crystals grow and interlock into a coagulation particle. If there are insufficient total solids and hydratable calcium sulfate, the clay solids appear to act as a suspending agent for the calcium sulfate during its hydration, so that the crystals of dihydrate being formed cannot gather the fine clay particles and interlock them into a coagulation particle. Instead, such blends form a coacervate, and a hydrated gel is formed that does not coalesce to a solid, load-bearing structure. It has been found that the point between coacervation and coalescent coagulation will vary somewhat depending upon the particular impurities in the clay suspension that affect crystal shape and amount of dihydrate growth. Of course, this can be offset somewhat by other additives favoring the growth of large, rapidly hydrated dihydrate crystals such as conventional accelerators and crystal habit modifiers. These are generally acid or salt materials that include for example, salt cations of potassium, sodium, ammonium, ferrous, aluminum, calcium and hydrogen.

The admixture of slime and hydratable calcium sulfate is thoroughly mixed by combining the materials in any high viscosity blender such as a pug mill and pumping the admixture to storage for coalescing. Either slime or calcium sulfate may be added to the other in forming the admixtures, and hydration conveniently occurs at ambient temperatures with about 15°-22° C. being optimum.

The following examples will further illustrate various specific embodiments of the process of the present invention. All amounts expressed will be parts by weight unless specified to the contrary. Of course, it is to be understood that the examples are by way of illustration only and are not to be construed as limitations on the present invention.

EXAMPLE 1

In a first series of evaluations, phosphatic clay slime suspensions (18% solids) from beneficiation operations were mixed with phosphoanhydrite II and sent to settling tanks for two weeks initial clarification. Thereafter, the supernatant liquor was drained off and the settled wet matrix sludge was allowed to continue to hydrate and dry. It was then evaluated for disintegration on immersion in water. In one such evaluation, 770 parts on a dry weight basis of phosphoanhydrite were mixed with 230 parts of phosphatic clay slime solids to give a suspension of 25% total solids in the admixture and passed to the settling tanks. After two weeks, supernatant liquor was removed and the thickened settled sludge was manually discharged. The sludge was found to be a moist sedimentation matrix of about 50% free water, 230 parts clay solids, 154 parts gypsum solids and 616 parts anhydrite solids. After four weeks to allow for further hydration of the anhydrite, a set matrix was removed that comprised less than 30% free water and about 230 parts clay solids, 462 parts anhydrite solids and 308 parts gypsum solids. A portion of the matrix was then submersed in water and was found to be still intact with no evidence of segregation or disintegration after 6 months. In this evaluation the solids were proportioned in the initial blending so that when fully hydrated to gypsum, the mass would be 80% by weight gypsum and 20% phosphatic clay slime solids. In comparison, a blending of phosphogypsum (hydrated) at the same proportion completely disintegrated within 3 hours when immersed in water. Reducing the amount of anhydrite in the initial mixing to allow for 10% by weight of gypsum seed crystals resulted in a soft matrix which when immersed in water disintegrated in one week. Proportioning the anhydrite to clay solids in a ratio of 3.3:1 by weight in the initial admixture provided a hard set matrix which withstood over 6 months immersion; changing the ratio to 1.47:1 disintegrated in 6 hours.

EXAMPLE 2

In another evaluation with the slime of Example 1, various mixtures were made with an alpha hemihydrate and observed for consolidation. Those proportions which solidified within about 2-5 hours were evaluated for compressive strengths.

Surprisingly, an 18% solids slime as obtained in the phosphastic-clay slime ponds developed a set mass in about 4½ hours when mixed with hemihydrate in weight proportions of hemihydrate that were 4 times the weight % slime solids in the clay suspension. This was surprising in view of the first fact that neither equal amounts of hemihydrate to slime solids nor 70 weight % hemihydrate to 30 weight % slime solids in a 15% clay solids suspension from the pond resulted in a solid mass after 20 days of settling. Cast cubes from the mixture which did set (weight composition 47.7% water, 10.5 weight % slime solids and 41.9 weight % hemihydrate) after drying and curing at ambient conditions for one week and 24 hours at 40° C. obtained a compressive strength of 359.4 pounds per square inch.

When the phosphatic-clay slime from the ponds was thickened with flocculants and/or heat to 30-40% solids in the slime, lower percentages of alpha hemihydrate not only solidified the mixtures but produced stronger cast cubes. Thus, a thickened slime at 40% slime solids mixed with an equal amount by weight of hemihydrate to the slime solids resulted in solidification at about 4½ hours, and cast cubes with a density of 1.45 grams per cubic centimeter had average compressive strengths of 706.5 pounds per square inch. A slime thickened to 30% solids and mixed in weight proportions of 70 parts hemihydrate to 30 parts slime solids resulted in a suspension of 60% total solids that solidified in about 2 hours and cast cubes with a density of 1.13 grams per cubic centimeter and average compressive strengths of 773.8 pounds per square inch.

EXAMPLE 3

In a series of laboratory experiments, various weight proportions of hydratable calcium sulfate solids to suspended solids in non-settling argillaceous slimes were evaluated.

In the first evaluation, various total solids concentrations and proportions of alpha hemihydrate calcium sulfate to clay solids were examined. Typical phosphatic clay slime suspensions of from 3 to 40 weight % suspended solids were mixed with an alpha hemihydrate. The hemihydrate was obtained by calcining phosphogypsum for ½ hour under 30 psig saturated steam pressure. The produced hemihydrate contained about 91% hemihydrate, 1% unreacted dihydrate and about 2% sand. The hemihydrate was mixed with the slime suspensions in weight proportions to obtain total suspended solids in the mixture of about 50 to about 70 weight %; and the mixtures observed for handling properties and for rehydration to a set solid matrix within 24 hours of mixing. Exemplary results are set forth in FIG. 1, in which mixtures which formed easily pumpable and handleable slurries and which set to a solid matrix within the time period are shown by the symbol "o". Those which did not set or were too stiff to pump are shown by the symbol "x". It may be seen from the figure that generally, within the preferred total solids range, as argillaceous solids content increases proportionally less hemihydrate is required to result in a coalesced solid.

In a second series of evaluations, various clay suspensions of a non-settling nature were mixed with different hydratable calcium sulfates. In a first evaluation in this series, a phosphatic clay slime of 30% suspended solids was mixed with fluoroanhydrite and with natural anhydrite rock. The fluoroanhydrite was itself a waste material of fine grain particle size, average particle size of 5 microns. The natural anhydrite rock contained 10 weight % gypsuum and was dry ball milled to 5100 cm$^2$/gm Blaine surface area before mixing with the slime. Both hydratable calcium sulfates were mixed with the slime in a weight proportion of 90 parts anhydrite to 10 parts of suspended solids in the slime on a dry weight basis. The resultant mixtures had total solids contents of 81.1 weight %. Results upon breaking the cast wet materials were:

| | Fluoroanhydrite II | Natural Anhydrite |
|---|---|---|
| Time allowed for hydration: | 2½ months | 1 month |
| free moisture | 12.4% | 6.2% |
| gypsum content | 34% | 63% |
| cast unconfined compressive strength | | |
| wet | 163 psi | 875 psi |
| dry | 915 psi | 1116 psi |

In comparison, the natural anhydrite sample, with an accelerated hydration rate of the gypsum in the ground rock, developed 437% more strength in the hydrating matrix in one-fifth the time of the fluoroanhydrite sample.

In a second evaluation in this series, a phosphogypsum sample was dehydrated at 204° C. for 3 days to soluble anhydrite III. It was then mixed with a 30% phosphatic clay slime in proportions to give 74% total solids in the mixture, of which, on a dry solids basis, 15% was phosphatic clay solids and 85% was soluble anhydrite (1:5.7 weight proportions). The soluble anhydrite immediately pulled the water out of the slime suspension resulting in a damp soil-like mass. After allowing the mass 39 days to hydrate and cure, it was submitted to California Soil Test analysis. The mass was compacted by ASTM D1557 procedures and tested for load bearing and unconfined compressive strength under ASTM D1883 procedures. This material had an unconfined compacted compressive strength of 128 psi; California Bearing Ratio of 56.5% of standard; and 120 psi load bearing at ½ inch penetration; showing that the material would be satisfactory as a load bearing landfill soil.

EXAMPLE 4

In another evaluation, a non-settling drilling mud waste slime of 21.5% suspended argillaceous solids was obtained. The mud was mixed with natural anhydrite rock that contained 10% gypsum impurity which could act as a hydration accelerator for the anhydrite. The rock was ground to 5100 cm$^2$/g Blaine surface area before mixing with the slime; and 80.3 parts by weight of the ground rock were blended with high viscosity agitation into 19.7 parts of the slime. This resulted in an admixture containing 84.6% total solids and a weight proportion of 85.5% anhydrite, 9.5% gypsum seed and 5% drilling mud solids on a dry weight basis (or 17 parts anhydrite and 1.9 parts of seed per part by weight on a dry weight basis of slime solids). On examination after six days, the mass had coalesced to a moist matrix (11.7% free water) having a wet compressive strength of 613 psi. On analysis it was found that about half of the anhydrite present in the starting admixture had hydrated to gypsum forming an interlocking matrix of gypsum crystals. A portion of the mass was compacted by ASTM D1557 procedures and tested for load bearing under ASTM D1883 procedures. The sample had a California Bearing Ratio of 44% of standard and showed 1220 psi load bearing at ½ inch penetration into the mass.

In another evaluation in this series the drilling mud slime was mixed with natural anhydrite to produce an admixture of 73.25% total solids with a proportion of 9 parts of anhydrite (containing gypsum impurity) per 1 part of drilling mud slime solids. On examination 23 days later, the hydrated mass had a wet compressive strength of 363 psi.

In a further evaluation a 15% suspended solids phosphatic clay slime and phosphogypsum from phosphate operations were mixed with fluoroanhydrite from hydrogen fluoride production. The admixture was blended with agitation to contain 81.8% fluoroanhydrite, 8.1% phosphogypsum and 9.98% phosphatic clay slime (64% total solids; 8.18:1 proportioning of anhydrite to slime solids on a dry solids basis plus 10% gypsum seed crystals). In 15 days the mixture had coalesced to a solid matrix having an average wet compressive strength of 354 psi. Another admixture of 30% phosphatic clay slime and natural anhydrite rock with 10% gypsum impurity were blended to 81% total solids and weight proportion of anhydrite to slime solids of 9:1 on a dry weight basis. In one month the coalesced matrix contained 63 weight % gypsum and had a wet compressive strength of 871 psi. A portion of the latter mass was compacted by ASTM D1557 procedures and tested for load bearing under ASTM D1883 procedures. The sample had a California Bearing Ratio of 61.5% of standard and showed 1260 psi load bearing at ½ inch penetration into the mass.

What is claimed is:

1. A method for solidifying colloidal argillaceous matter in suspension in a non-settling aqueous medium to a load bearing solid consisting essentially of:
    (a) adding, to a colloidal argillaceous suspension of about 1–40% solids, an effective amount of hydratable calcium sulfate with thorough mixing such that the admixture contains about 45–85 weight % total solids and a weight proportion of hydratable calcium sulfate to argillaceous matter solids on a dry solids basis of from about 1:1 to about 20:1 provided further that at weight proportions of less than about 3:1 the total solids are at least about 50 weight %; and
    (b) allowing a substantial portion of the hydratable calcium sulfate in the admixture to hydrate to an interlocking matrix of gypsum crystals having load bearing strength.

2. The method of claim 1 in which said hydratable calcium sulfate is anhydrite.

3. The method of claim 1 in which said hydratable calcium sulfate is hemihydrate.

4. The method of claim 1 in which said hydratable calcium sulfate is alpha hemihydrate.

5. The method of claim 1 in which said hydratable calcium sulfate is anhydrite II.

6. The method of claim 1 in which said hydratable calcium sulfate is natural anhydrite.

7. The method of claim 1 in which said hydratable calcium sulfate is soluble anhydrite.

8. The method of claim 1 in which said argillaceous suspension in phosphatic clay slime.

9. The method of claim 1 in which said argillaceous suspension is drilling mud slime.

10. The method of claim 1 in which said suspension contains about 1–10% suspended solids and said admixture contains initially less than about 45% total solids, and further including the steps of:

hydrating about 25–60% of the hydratable calcium sulfate present in the admixture initially to dihydrate;

decanting to separate clarified water from moist coagulated solids and hydrating the moist coagulated solids to coalesced hardened solids.

11. The method of claim 1 in which said hydratable calcium sulfate is phosphoanhydrite.

12. The method of claim 1 in which said hydratable calcium sulfate is phosphohemihydrate.

13. The method of claim 1 in which said hydratable calcium sulfate is fluoroanhydrite.

14. The method of claim 1 in which said hydratable calcium sulfate is ground natural anhydrite containing about 10% gypsum seed.

15. The method of claim 1 in which said slime contains about 15–25% solids.

16. The method of claim 1 in which said admixture is passed through a pug mill.

17. The method of claim 1 in which said slime contains about 5–40% solids; said hydratable calcium sulfate is alpha hemihydrate; and said admixture contains about 47–70% total solids.

* * * * *